US012632905B2

(12) United States Patent
Dauhiala

(10) Patent No.: US 12,632,905 B2
(45) Date of Patent: May 19, 2026

(54) COMPUTING SYSTEM FOR CLASSIFYING TAX EFFECTIVE DATE

(71) Applicant: Vertex, Inc., King of Prussia, PA (US)

(72) Inventor: Lizaveta Dauhiala, Minsk (BY)

(73) Assignee: Vertex, Inc., King of Prussia, PA (US)

( * ) Notice: Subject to any disclaimer, the term of this patent is extended or adjusted under 35 U.S.C. 154(b) by 94 days.

(21) Appl. No.: 18/057,142

(22) Filed: Nov. 18, 2022

(65) Prior Publication Data

US 2024/0169445 A1     May 23, 2024

(51) Int. Cl.
G06Q 40/12 (2023.01)
G06F 40/103 (2020.01)
G06F 40/295 (2020.01)

(52) U.S. Cl.
CPC ......... G06Q 40/123 (2013.12); G06F 40/103 (2020.01); G06F 40/295 (2020.01)

(58) Field of Classification Search
CPC ... G06Q 40/123; G06F 40/103; G06F 40/295; G06F 40/169; G06F 40/216
See application file for complete search history.

(56) References Cited

U.S. PATENT DOCUMENTS

| | | | | |
|---|---|---|---|---|
| 10,614,345 | B1 * | 4/2020 | Tecuci | G06N 3/08 |
| 11,443,102 | B1 * | 9/2022 | Wilson | G06F 3/0482 |
| 11,520,815 | B1 * | 12/2022 | Gutta | G06F 40/186 |
| 11,803,401 | B1 * | 10/2023 | Ferrucci | G06F 40/279 |
| 11,907,650 | B2 * | 2/2024 | Wilson | G06F 3/0482 |
| 2004/0024665 | A1 * | 2/2004 | Foster | G06Q 40/02 |
| | | | | 705/31 |
| 2013/0332450 | A1 * | 12/2013 | Castelli | G06F 16/35 |
| | | | | 707/E17.046 |
| 2014/0201045 | A1 * | 7/2014 | Pai | G06Q 40/123 |
| | | | | 705/31 |
| 2020/0005032 | A1 * | 1/2020 | Freed | G06Q 10/10 |
| 2020/0226219 | A1 * | 7/2020 | Dahlman | G06F 40/30 |
| 2022/0164397 | A1 * | 5/2022 | Escalona | G06F 40/20 |
| 2023/0049167 | A1 * | 2/2023 | Wilson | G06V 30/19107 |
| 2023/0214754 | A1 * | 7/2023 | Eidelman | G06Q 10/06375 |
| | | | | 705/7.37 |
| 2024/0021280 | A1 * | 1/2024 | Barnard | G16H 10/40 |
| 2024/0062011 | A1 * | 2/2024 | Kanuga | G06F 40/295 |
| 2024/0062108 | A1 * | 2/2024 | Pham | G06N 20/00 |

OTHER PUBLICATIONS

"Yamada et al., LUKE: Deep Contextualized Entity Representations with Entity-aware Self-attention, pp. 1-13" (Year: 2020).*

* cited by examiner

*Primary Examiner* — Daniel W Parcher
(74) *Attorney, Agent, or Firm* — Alleman Hall LLP

(57) ABSTRACT

A computing system is provided, including a processor configured to, at inference time, input an article to a first trained machine learning (ML) model. The processor is further configured to extract, via the first trained ML model, candidate dates from the article. The processor is further configured to input the extracted candidate dates to a second trained ML model, and classify, via the second trained ML model, each extracted candidate date into one of plurality of classifications including a tax effective date and a date other than a tax effective date. The processor is further configured to create a modified article that highlights the candidate date classified as the tax effective date and the candidate date classified as the date other than the tax effective date, in which the tax effective date and the date other than the tax effective date are highlighted in a visually distinguishable manner.

17 Claims, 7 Drawing Sheets

| | RECALL | PRECISION |
|---|---|---|
| EXTRACTED CANDIDATE DATES 54 | 0.95 | N/A |
| CLASSIFIED TAX EFFECTIVE DATE 60 | 0.98 | 0.79 |
| EXTRACTED TAX RATES 66/AMOUNTS 68 | 0.99 | 0.78 |

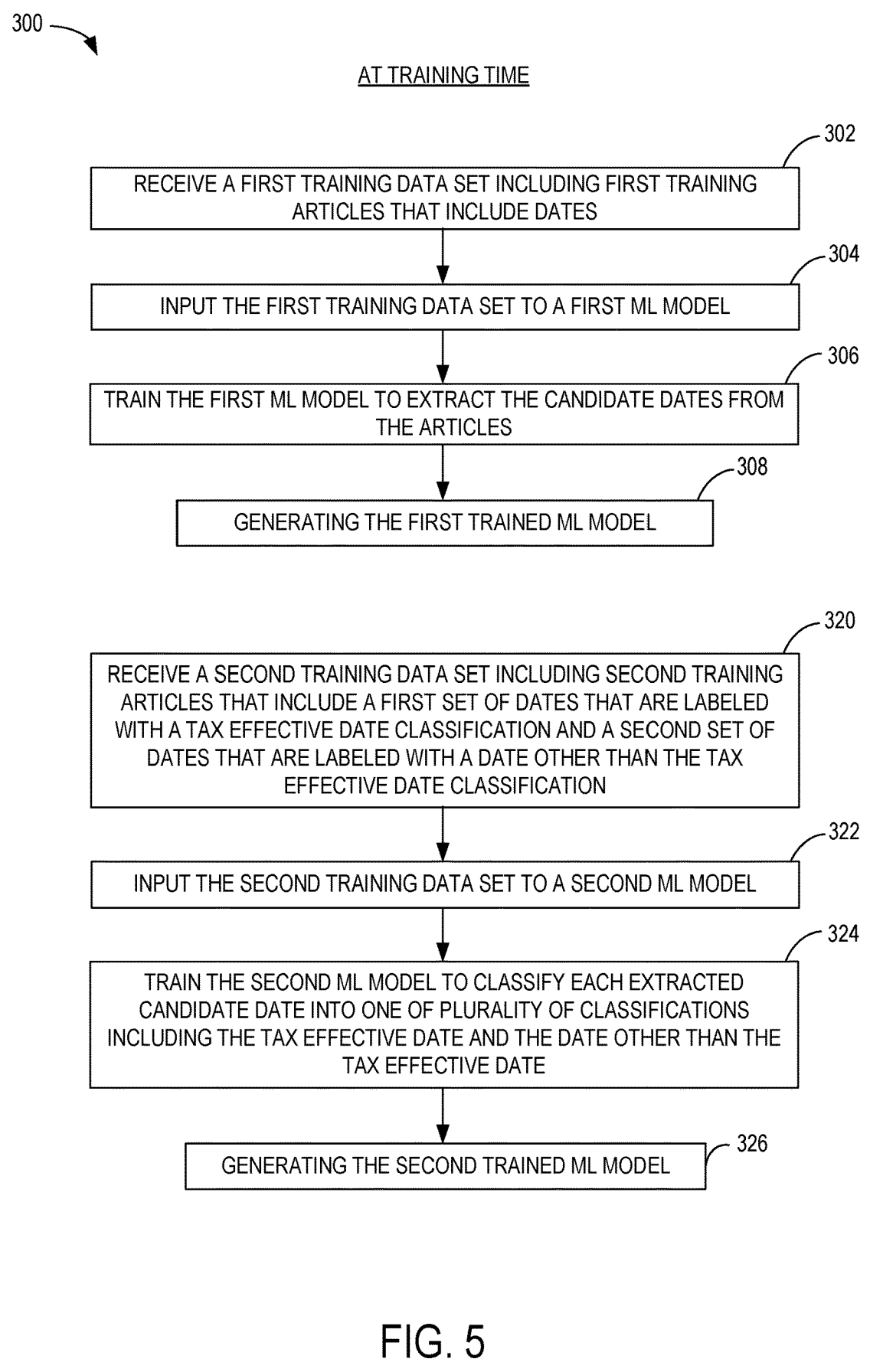

AT TRAINING TIME

302

RECEIVE A FIRST TRAINING DATA SET INCLUDING FIRST TRAINING ARTICLES THAT INCLUDE DATES

304

INPUT THE FIRST TRAINING DATA SET TO A FIRST ML MODEL

306

TRAIN THE FIRST ML MODEL TO EXTRACT THE CANDIDATE DATES FROM THE ARTICLES

308

GENERATING THE FIRST TRAINED ML MODEL

320

RECEIVE A SECOND TRAINING DATA SET INCLUDING SECOND TRAINING ARTICLES THAT INCLUDE A FIRST SET OF DATES THAT ARE LABELED WITH A TAX EFFECTIVE DATE CLASSIFICATION AND A SECOND SET OF DATES THAT ARE LABELED WITH A DATE OTHER THAN THE TAX EFFECTIVE DATE CLASSIFICATION

322

INPUT THE SECOND TRAINING DATA SET TO A SECOND ML MODEL

324

TRAIN THE SECOND ML MODEL TO CLASSIFY EACH EXTRACTED CANDIDATE DATE INTO ONE OF PLURALITY OF CLASSIFICATIONS INCLUDING THE TAX EFFECTIVE DATE AND THE DATE OTHER THAN THE TAX EFFECTIVE DATE

326

GENERATING THE SECOND TRAINED ML MODEL

FIG. 5

COMPUTING SYSTEM FOR CLASSIFYING TAX EFFECTIVE DATE

BACKGROUND

Federal, state, and municipal governments and government agencies frequently propose and enact new tax laws and regulations in accordance with evolving tax policies. Tax experts and professionals need to review the laws and regulations to stay up to date. These laws and regulations, which are often composed of hundreds or thousands of pages of text, contain various tax rates and effective dates. These tax rates and effective dates are important to understand the impact of the new laws and regulations. Thus, being able to efficiently identify these tax rates and dates within the voluminous text of those articles would allow tax experts and professionals to work more efficiently. Current approaches to identification include manually reading the entire text of the laws and regulations, which takes significant time and incurs a great cost. Keyword searching digital versions of the texts of the laws and regulations is also possible, but suffers from the drawback of missing or misidentifying certain rates and effective dates. Since the impact of the laws and regulations can be significant, manual reading of laws and regulations is still preferred to reduce the possibility of such errors, at great time and cost.

SUMMARY

To address the issues discussed herein, computerized systems and methods for classifying tax effective dates are provided. In one aspect, a computerized system is provided that includes a processor configured to, at inference time, input an article to a first trained machine learning (ML) model. The processor is further configured to extract, via the first trained ML model, candidate dates from the article. The processor is further configured to input the extracted candidate dates to a second trained ML model, and classify, via the second trained ML model, each extracted candidate date into one of plurality of classifications including a tax effective date and a date other than a tax effective date. In one aspect, the processor is further configured to create a modified article that highlights the candidate date classified as the tax effective date and the candidate date classified as the date other than the tax effective date, in which the tax effective date and the date other than the tax effective date are highlighted in a different manner so as to be visually distinguishable from each other. In another aspect, the processor is further configured to input the article to a regular expression engine, and extract, via the regular expression engine, candidate tax rates and/or tax amounts from the article. Additionally, the processor may be further configured to create a modified article that highlights the extracted candidate tax rates and the extracted candidate tax amounts.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 illustrates accuracy results based on measures of recall and precision performed by the first and second trained ML models and a regular expression engine of the computing system of FIGS. 1 and 2.

FIG. 5 shows a flowchart of a computerized method according to one example implementation of the computing system of FIG. 1 at training time.

DETAILED DESCRIPTION

Figure 1:
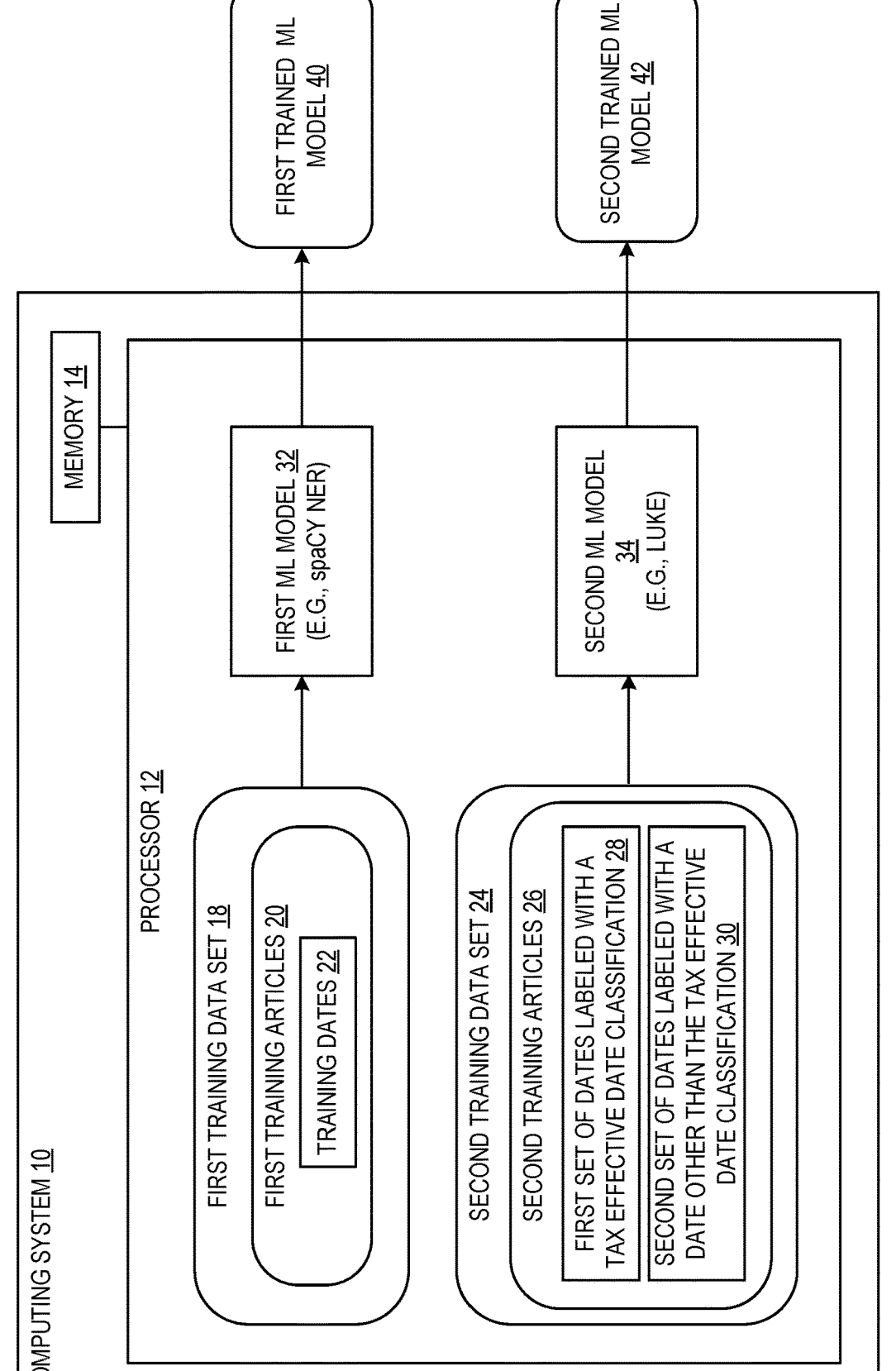
FIG. 1 is a schematic diagram of a computing system including a processor configured to train a first machine learning (ML) model to extract candidate dates from first training articles and to train a second ML model to classify each extracted candidate date into one of plurality of classifications including a tax effective date and a date other than the tax effective date at training time.
Figure 2:
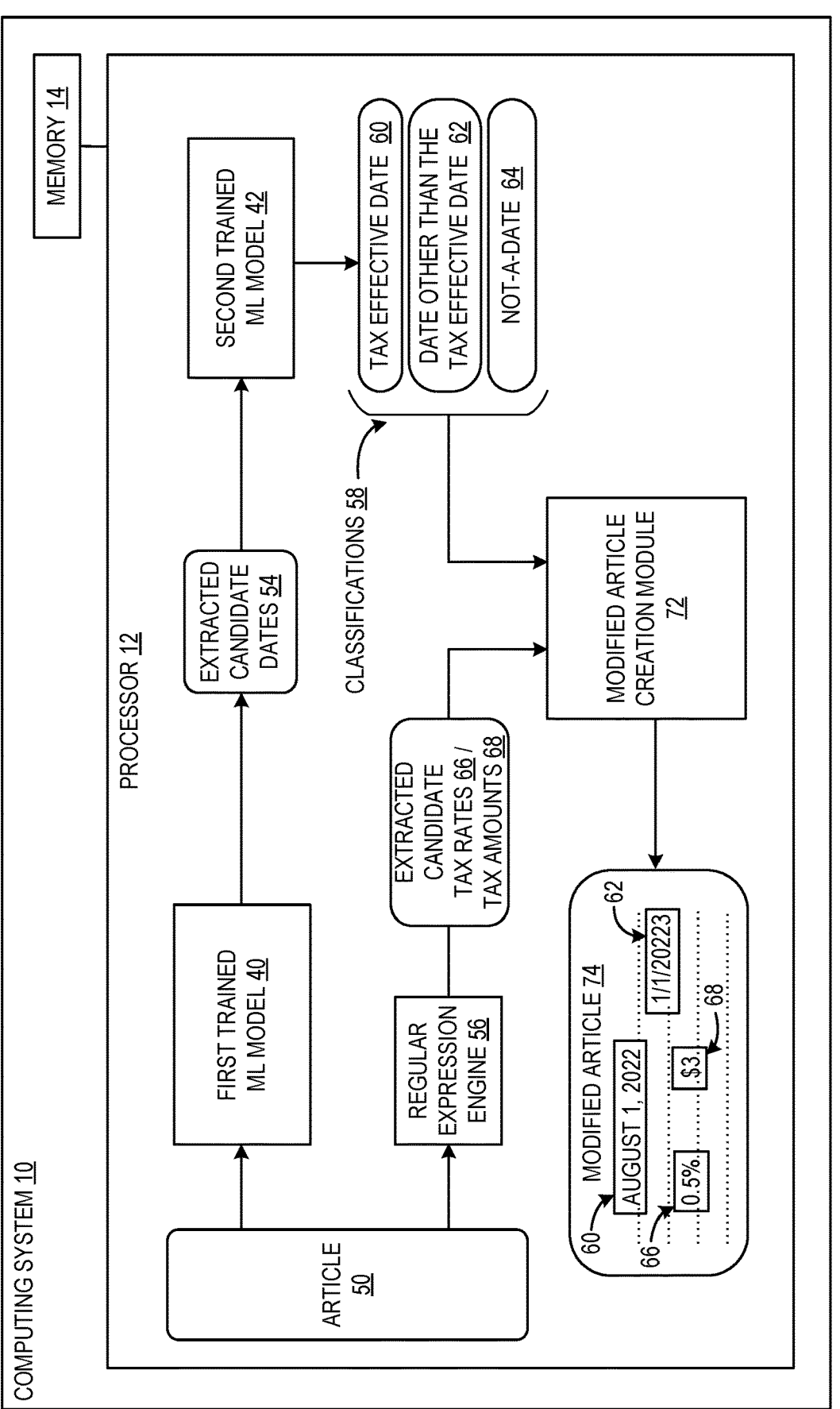
FIG. 2 is a schematic diagram of the computing system configured to extract candidate dates from an article via the first trained ML model of the computing system of FIG. 1, classify each extracted candidate date into one of plurality of classifications including a tax effective date and a date other than a tax effective date via the second trained ML model of the computing system of FIG. 1, and create a modified article that highlights the candidate date classified as the tax effective date and the candidate date classified as the date other than the tax effective date at inference time.

As schematically illustrated in FIGS. 1 and 2, to address the issues identified above, a computing system 10 for classifying a tax effective date is provided. FIG. 1 illustrates aspects of the system 10 at training time, that is, when a first machine learning (ML) model 32 and a second ML model 34 are trained, while FIG. 2 illustrates aspects of the system 10 at inference time, that is, when a first trained ML model 40 and a second trained ML model 42 are applied to classify each extracted candidate date into one of plurality of classifications including a tax effective date.

As illustrated in FIG. 1 the computing system 10 includes a processor 12 configured to train the first machine learning ML model 32 to extract candidate dates 54 (see FIG. 2) from first training articles 20 and to train a second ML model 34 to classify each extracted candidate date 54 into one of plurality of classifications 58 (see FIG. 2) including a tax effective date 60 (see FIG. 2) and a date other than the tax effective date 62 (see FIG. 2) at training time. Continuing with FIG. 1, the computing system 10 may include one or more processors 12 having associated memory 14. For example, the computing system 10 may include a cloud server platform including a plurality of server devices, and the one or more processors 12 may be one processor of a single server device, or multiple processors of multiple server devices. The computer system 10 may also include one or more client devices in communication with the server devices, in which one or more of processors 12 may be situated in such a client device. Typically, training-time and inference-time operations are executed on different devices (e.g., a first computing device and a second computing device) of the computer system, although they may be executed by the same device. Below, the functions of computing system 10 will be described as being executed by the processor 12 by way of example, and this description shall be understood to include execution on one or more processors distributed among one or more of the devices discussed above.

Continuing with FIG. 1, the associated memory 14 may store instructions that cause the processor 12 to receive a first training data set 18 including first training articles 20 that include training dates 22. The first training articles 20 may be tax bills or articles regarding tax systems and rules that include various dates such as a tax effective date, a new tax announcement date, an article publication date, and other dates. The first training articles 20 may also include tax rates such as a sales tax rate of 0.3%, and tax amounts, such as a tax fee of $0.8 per gallon or airport tax fee of $3.00. These particular values are merely exemplary. Features in the text itself, such as the format in which the dates and rates are written and the relative positional relationship of the dates and rates to other words in the text can be encoded as embeddings that enable the models described herein to learn features associated with these data types and make inferences regarding whether a particular passage of text contains one of the data types, i.e., a tax effective date, tax rate, etc. After receiving the first training data set 18, the processor 12 may be further configured to input the first training data set 18 to the first ML model 32 and train the first ML model 32 to extract the candidate dates from the first training articles 20 to generate the first trained ML model 40. The first ML model 32 may be a spaCy NER model. Named Entity Recognition (NER) is a component of a Natural Language Processing (NLP) system that is designed for the identification and classification of named entities. A NER model is pretrained to recognize different named entities. At inference time, a NER first identifies a named entity within a raw, structured text. It then categorizes the entity into the most suitable class, such as dates, persons, organizes, places, and money. For example, a NER might identify "Jul. 8, 2022," "7/8/22," and "07/08/2022" within a text and classify these as a date. As another example, a NER might further identify "New York" and "Mumbai" and classifies these as places. As another example, a NER might further identify "1 million dollars" and "1,000 Great Britain pounds" and classify them as money. The spaCy model is an open-source Natural Language Processing library that has built-in methods for Named Entity Recognition (NER). The NER application contained within spaCy is referred to as spaCy NER and may be utilized as the first ML model 32. It will be appreciated that other ML models such as Stanford NER, which is a Java implementation of a Named Entity Recognizer, may also be utilized as the first ML model 32. Thus, the first ML model 32 (e.g., spaCy NER or Stanford NER) is trained to identify and extract dates including the tax effective date and other dates from the first training articles 20 to generate the first trained ML model 40, which is used at inference time as discussed below.

Continuing with FIG. 1, the processor 12 may be further configured to receive a second training data set 24 including second training articles 26 that include a first set of dates that are labeled with a tax effective date classification 28 and a second set of dates that are labeled with a date other than the tax effective date classification 30. Similar to the first training articles 20 as discussed above, the second training articles 26 may be tax bills or articles regarding tax systems and rules. However, the second training articles 26 may further include the first set of dates that are labeled with a tax effective date classification 28 such as "Effective Date: Jul. 8, 2022" and the second set of dates that are labeled with a date other than the tax effective date classification 30 such as "Publication Date: Aug. 1, 2022," or simply "Not Tax Effective Date: Aug. 1, 2022." In practice, the raw labeled dataset (i.e., the second training dataset) may include the start and end offset of an identified date in a sentence, as well as a classification label for the identified date, such as Tax Effective Date or Not Tax Effective Date. In this way, the labels may be provided with respect to a start token (or character) and end token (or character) of the detected date that is being classified in the article. In an alternative configuration, the labels may be provided in the second training dataset with the span text (i.e., text between the start offset and end offset) of the dates extracted as shown above. After receiving the second training data set 24, the processor 12 may be further configured to input the second training data set 24 to the second ML model 34 and train the second ML model 34 to classify each extracted candidate date 54 (see FIG. 2) into one of plurality of classifications 58 (see FIG. 2) including the tax effective date 60 (see FIG. 2) and the date other than the tax effective date 62 (see FIG. 2) to generate the second trained ML model 42. The second ML model 34 may be a Language Understanding with Knowledge-based Embeddings (Luke) neural network model. The Luke neural network model utilizes a pretrained contextualized representation of words and entities and is based on a bidirectional transformer. The model treats words and entities in a given text as independent tokens and outputs contextualized representations of the words and entities. The second training articles 26 may be divided into sentences by a sentence divider (e.g., spaCy Sentencizer) and passed through the Luke neural network model one sentence at a time, since the article can be too long to meet a standard 512 token limitation. Thus, the Luke neural network model may receive each sentence along with the corresponding candidate dates' start and end offsets. Thus, the second ML model 34 such as Luke neural network is trained to classify each extracted candidate date 54 (see FIG. 2) into one of plurality of classifications 58 (see FIG. 2) including the tax effective date 60 (see FIG. 2) and the date other than the tax effective date 62 (see FIG. 2) to generate the second trained ML model 42, which is used at inference time as discussed below.

FIG. 2 shows a schematic diagram of the computing system 10 configured to extract candidate dates 54 from an article 50 via the first trained ML model 40, classify each extracted candidate date 54 into one of plurality of classifications 58 including a tax effective date 60 and a date other than a tax effective date 62 via the second trained ML model 42, and create a modified article 74 that highlights the candidate date 54 classified as the tax effective date 60 and the candidate date 54 classified as the date other than the tax effective date 62 at inference time. The associated memory 14 executes stored instructions that cause the processor 12 to input the article 50 to the first trained ML model 40 at inference time. The article 50 may be a tax-related article, such as proposed or enacted legislative or regulatory text, including a tax bill, law, rule or regulation, that details, summarizes, outlines or illustrates taxes enacted by federal, state, or municipal or other taxing jurisdictions. The article 50 may be a tax article in a digital format such as text, PDF, and .doc, and may be short or lengthy. In some cases, the article 50 may consist of hundreds of pages that include various dates and tax rates. The article 50 may be distributed to tax experts for analysis or tax professionals for study and research. The processor 12 may be further configured to extract candidate dates 54 from the article 50 via the first trained ML model 40. The first trained ML model 40 (e.g., spaCy NER model) may extract any dates in the article 50, including a tax effective date, tax registration date, and article publication date, as the candidate dates 54. Due to errors made by the first trained ML model 40, the candidate dates 54 may also include a term unrelated to a date (i.e., "not-a-date").

The processor 12 may be further configured to input the extracted candidate dates 54 to the second trained ML model 42 and classify each extracted candidate date 54 into one of plurality of classifications 58 including the tax effective date 60 and the date other than the tax effective date 62 via the second trained ML model 42. Since the plurality of classifications 58 further includes a not-a-date classification 64, the second trained ML model 42 is further configured to classify each extracted candidate date 54 into one of the plurality of classifications including the not-a-date classification 64. For each extracted candidate date 54 in the article 50, the appropriate classification 58 among the classified tax effective date 60, the date other than the tax effective date 62, and not-a-date classification 64 is communicated to a modified article creation module 72, which in turn produces the modified article 74 based partially on this input, as discussed below.

Continuing with FIG. 2, the processor 12 may be further configured to input the article 50 to a regular expression engine 56, and extract candidate tax rates 66 and/or tax amounts 68 from the article 50 via the regular expression engine 56. As discussed above, the article 50 may include tax information such as sales tax rates (e.g., 0.3%), fuel tax amounts or fees (e.g., $0.08/gallon), and airport tax amounts or fees (e.g., $3.00). The regular expression engine 56 finds a character match in text by using patterns that describe character combinations. A regular expression is a sequence of characters that specifies a search pattern text. Generally, such patterns are used by string-searching algorithms to execute "find" or "find and replace" operations on strings or to validate input. The regular expression engine 56 executes a regular expression operation on one character at a time in left-to-right order. To find a tax rate or tax amount, for instance, the regular expression engine 56 may attempt to find "numbers+%" and "$+numbers." It will be appreciated that the regular expression engine 56 may be configured to attempt to extract tax rates only (e.g., 0.3%), tax amounts only (e.g., $0.08/gallon), or both tax rates and tax amounts according to the particular situation. The extracted candidate tax rates 66 and/or tax amounts 68 are transmitted to the modified article creation module 72, which in turn produces the modified article 74 based partially on this input, as discussed below.

The processor 12 is further configured to, via the modified article creation module 72, create the modified article 74 that highlights the candidate date classified as the tax effective date 60, the candidate date classified as the date other than the tax effective date 62, the extracted candidate tax rates 66, and/or the extracted candidate tax amounts 68. Of course, it will be appreciated that the particular classifications 58 identified in each article 50 will depend on the content of that article 50, and thus not all classifications will be identified and highlighted in a particular article. The tax effective date 60 and the date other than the tax effective date 62 may be highlighted in a different manner so as to be visually distinguishable from each other. For example, the extracted candidate tax rates 66 may be highlighted in red, while the date other than the tax effective date 62 may be highlighted in green. Furthermore, the extracted candidate tax rates 66 and the extracted candidate tax amounts 68 may be highlighted in a different manner so as to be visually distinguishable from each other. For instance, the extracted candidate tax rates 66 may be shown in underlined text, and the extracted candidate tax amounts 68 may be shown in bold text. As used herein, the term "highlighted in a different manner so as to be visually distinguishable from each other" is intended to include use of different font colors, text boxes of different colors or styles (red and black, dashed and solid lines, different line widths, etc.), text highlighting of different colors, different font styles (bold, underline, italic, outline, shadow, reflection, etc.), font types with different appearances (Times New Roman, Arial Black, etc.), different font sizes, or other manner of graphical emphasis that visually distinguishes a particular classification from a different classification.

Figure 3:
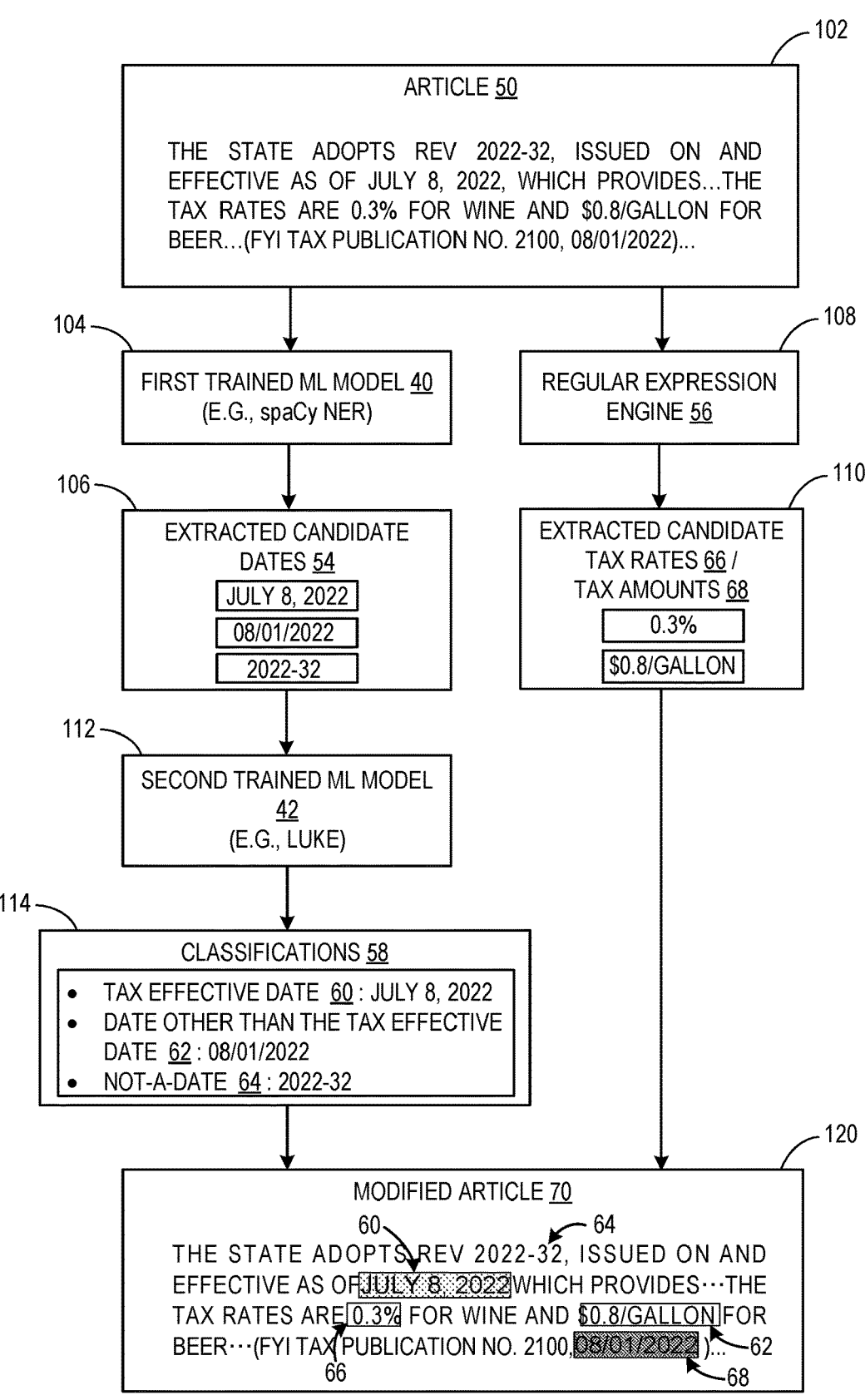
FIG. 3 shows an example modified article created from an article via the computing system of FIG. 1.

FIG. 3 shows an example modified article 70 created from the article 50 via the computing system 10. In the depicted example, the article 50 is a tax bill which includes tax dates, tax rates, tax fees and other dates. As shown at 104, the article 50 of the tax bill is input into the first trained ML model 40. As shown at 106, the first trained ML model 40 extracts the candidate dates 54 including "Jul. 8, 2022" and "08/01/2022." The first trained ML model 40 also extracts "2022-32" as one of the candidate dates 54 by error. At 112, the extracted candidate dates 54 are further input into the second trained ML model 42. As shown at 114, the second trained ML model 42 classifies each extracted candidate date 54 into one of the classifications 58, namely, the tax effective date 60, the date other than the tax effective date 62, or the not-a-date classification 64. In this example, "Jul. 8, 2022" is classified as the tax effective date 60, "08/01/2022" is classified as the date other than the tax effective date 62, and "2022-32" is classified as the not-a-date classification 64. Additionally, the article 50 of the tax bill is input to the regular expression engine 56 at 108. As shown at 110, the regular expression engine 56 extracts the candidate tax rates 66 including "0.3%" and the candidate tax amounts 68 including "$0.8/gallon." As shown at 120, the modified article 70 is created based on the classified dates and the extracted tax rates and amounts. In the modified article 70, the tax effective date 60 "Jul. 8, 2022," the date other than the tax effective date 62 "08/01/2022," the candidate tax rate 66 "0.3%," and the candidate tax amount 68 "$0.8/gallon" are highlighted in a different manner (different levels of greyscale in text highlighting in the illustrated example) so as to be visually distinguishable from each other. The not-a-date classification 64 "2022-32" may be highlighted in a different color or not be highlighted on the modified article 70 as a default. Thus, the modified article 70 allows tax experts and analysts to quickly identify tax effective dates and tax rates within tax articles, which is particularly useful for lengthy articles or articles with numerous numbers that are not dates or dates that are not tax related. As a result, these tax experts and analysts may more quickly gain an understanding of the tax-related documents. In this way, the modified article 70 provides a technical advantage for the tax experts and analysts.

FIG. 4 illustrates accuracy results based on measures of recall and precision performed by the first trained ML model 40, second trained ML model 42, and the regular expression engine 56 of the computing system 10 of FIGS. 1 and 2. Recall is the fraction of relevant instances that were retrieved among the total number of relevant instances, while precision is the fraction of relevant instances among the retrieved instances. Precision and recall are two numbers which together are used to evaluate the performance of classification or information retrieval systems. As shown in the table 150 of FIG. 4, the extracted candidate dates 54 were recognized with 0.95 recall. The classified tax effective dates 60 were recognized with 0.98 recall and 0.79 precision, while the extracted candidate tax rates 66/tax amounts 68 were recognized with 0.99 recall and 0.78 precision.

FIG. 5 shows a flowchart of a computerized method 300 according to one example implementation of the computing system of FIG. 1, at training time. At step 302, the method may include receiving a first training data set including first training articles that include training dates. At step 304, the method may further include inputting the first training data set to a first ML model. At step 306, the method may further include training the first ML model to extract the candidate dates from the first training articles. At step 308, the method may further include generating the first trained ML model, based on the training at step 306.

Continuing with FIG. 5, at step 320, the method may further include receiving a second training data set including second training articles that include a first set of dates that are labeled with a tax effective date classification and a second set of dates that are labeled with a date other than the tax effective date classification. At step 322, the method may further include inputting the second training data set to a second ML model. At step 324, the method may further include training the second ML model to classify each extracted candidate date into one of plurality of classifications including the tax effective date and the date other than the tax effective date. At step 326, the method may further include generating the trained second ML model, based on the training at step 324.

Figure 6:
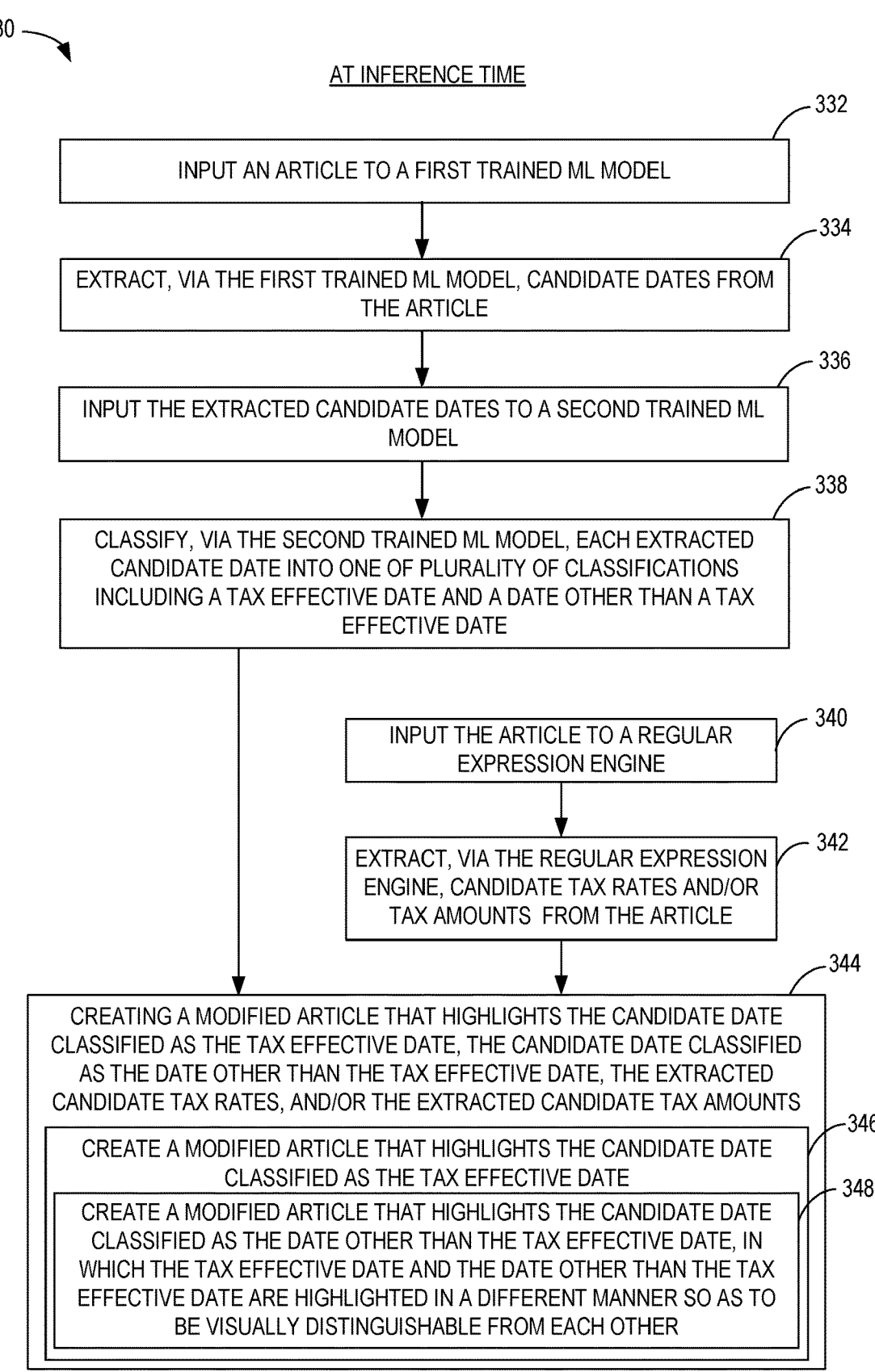
FIG. 6 shows a flowchart of a computerized method according to one example implementation of the computing system of FIG. 2 at inference time.

FIG. 6 shows a flowchart of a computerized method 330 according to one example implementation of the computing system of FIG. 2, at inference time. At step 332, the method may include inputting an article to a first trained ML model. At step 334, the method may further include extracting, via the first trained ML model, candidate dates from the article. At step 336, the method may further include inputting the extracted candidate dates to a second trained ML model. At step 338, the method may further include classifying, via the second trained ML model, each extracted candidate date into one of plurality of classifications including a tax effective date and a date other than a tax effective date.

Continuing with FIG. 6, at step 340, the method may further include inputting the article to a regular expression engine. At step 342, the method may further include extracting, via the regular expression engine, candidate tax rates and/or tax amounts from the article. At step 344, the method may further include classifying, via the second trained ML model, each extracted candidate date into one of plurality of classifications including a tax effective date and a date other than a tax effective date. At step 346, the method may further include creating a modified article that highlights the candidate date classified as the tax effective date. At step 348, the method may further include creating a modified article that highlights the candidate date classified as the date other than the tax effective date, in which the tax effective date and the date other than the tax effective date are highlighted in a different manner so as to be visually distinguishable from each other.

The above described systems and methods may be implemented to enable processing of large volumes of textual articles in a short amount of time to quickly identify tax effective dates, as well as tax rates and/or tax amounts, thereby increasing the speed at which companies monitoring changes in tax laws globally can identify such changes in those tax laws in particular jurisdictions. In addition to saving time, the systems and methods described herein provide a technical solution that potentially saves on the cost of such tax research by minimizing the time spent by tax experts and analysts to perform this task.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
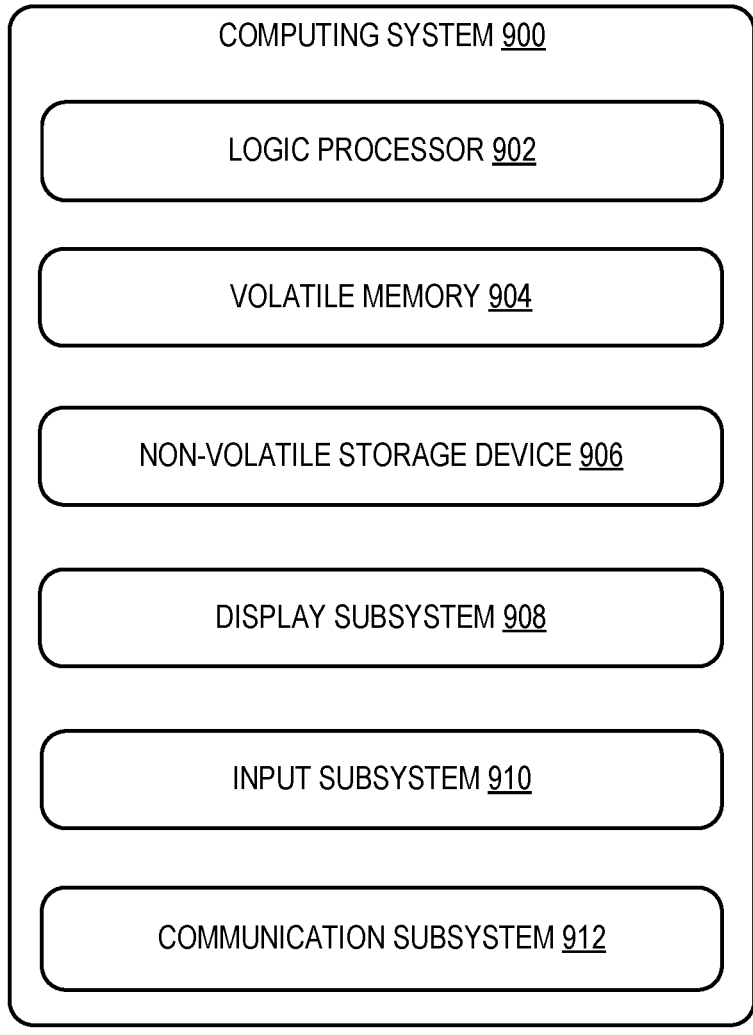
FIG. 7 shows a block diagram of an example computing system that may be utilized to implement the computing system of FIGS. 1 and 2.

FIG. 7 schematically shows a non-limiting embodiment of a computing system 900 that can enact one or more of the methods and processes described above. Computing system 900 is shown in simplified form. Computing system 900 may embody the computing device 10 described above and illustrated in FIGS. 1 and 2. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display sub system 908, input sub system 910, communication sub system 912, and/or other components not shown in FIG. 7.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed, e.g., to hold different data.

Non-volatile storage device 906 may include physical devices that are removable and/or built in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
    a processor configured to:
        at inference time,
        input an article to a first trained machine learning (ML) model;
        extract, via the first trained ML model, candidate dates from the article;
        input the extracted candidate dates to a second trained ML model; and
            classify, via the second trained ML model, each extracted candidate date into one of plurality of classifications including a tax effective date, a date other than a tax effective date, and a not-a-date, wherein
    the first trained ML model has been trained on a first training data set including first training articles to identify the candidate dates,
    the second trained ML model has been trained on a second training data set including second training articles that include a first set of dates that are labeled with a tax effective date classification and a second set of dates that are labeled with a date other than a tax effective date classification, and that also include text that is not-a-date, to classify the candidate dates into one of the plurality of classifications including the tax effective date classification, the date other than a tax effective date classification, and a not-a-date classification,
    the first trained ML model is a named entity recognition model,
    the second trained ML model is a neural network model that utilizes pretrained contextual embedding representations of words and entities,
    the tax effective date, the date other than the tax effective date, and the not-a-date are highlighted in a different manner so as to be visually distinguishable from each other, and the second training articles of the second training data set are divided into sentences by a sentence divider and processed by the second trained ML model one sentence at a time, each sentence being included together with start and end offsets of the candidate dates for classification.

2. The computing system of claim 1, wherein the processor is further configured to create a modified article that highlights the candidate date classified as the tax effective date.

3. The computing system of claim 2, wherein the processor is further configured to create a modified article that highlights the candidate date classified as the date other than the tax effective date.

4. The computing system of claim 1, wherein the processor is further configured to:

at training time, receive the first training data set including the first training articles that include training dates;

input the first training data set to a first ML model; and train the first ML model to extract the candidate dates from the first training articles, to thereby generate the first trained ML model.

5. The computing system of claim 4, wherein the first trained ML model is a spaCy NER model.

6. The computing system of claim 4, wherein the processor is further configured to:

at training time, receive the second training data set including the second training articles that include the first set of dates that are labeled with the tax effective date classification and the second set of dates that are labeled with the date other than a tax effective date classification;

input the second training data set to a second ML model; and train the second ML model to classify each extracted candidate date into one of plurality of classifications including the tax effective date and the date other than a tax effective date, to thereby generate the trained second ML model.

7. The computing system of claim 6, wherein the second ML model is a LUKE neural network model.

8. The computing system of claim 1, wherein the processor is further configured to:

input the article to a regular expression engine; and extract, via the regular expression engine, candidate tax rates and/or tax amounts from the article.

9. The computing system of claim 8, wherein the processor is further configured to create a modified article that highlights the extracted candidate tax rates and the extracted candidate tax amounts.

10. A computerized method, comprising:

at inference time, inputting an article to a first trained machine learning (ML) model;

extracting, via the first trained ML model, candidate dates from the article;

inputting the extracted candidate dates to a second trained ML model; and classifying, via the second trained ML model, each extracted candidate date into one of plurality of classifications including a tax effective date, a date other than a tax effective date, and a not-a-date, wherein the first trained ML model has been trained on a first training data set including first training articles to identify the candidate dates, the second trained ML model has been trained on a second training data set including second training articles that include a first set of dates that are labeled with a tax effective date classification and a second set of dates that are labeled with a date other than a tax effective date classification, and that also include text that is not-a-date, to classify the candidate dates into one of the plurality of classifications including the tax effective date classification, the date other than a tax effective date classification, and a not-a-date classification, the first trained ML model is a named entity recognition model, the second trained ML model is a neural network model that utilizes pretrained contextual embedding representations of words and entities, the tax effective date, the date other than the tax effective date, and the not-a-date are highlighted in a different manner so as to be visually distinguishable from each other, the second training articles of the second training data set are divided into sentences by a sentence divider and processed by the second trained ML model one sentence at a time, each sentence being included together with start and end offsets of the candidate dates for classification.

11. The computerized method of claim 10, further comprising:

creating a modified article that highlights the candidate date classified as the tax effective date.

12. The computerized method of claim 11, further comprising:

creating a modified article that highlights the candidate date classified as the date other than a tax effective date.

13. The computerized method of claim 12, further comprising:

at training time, receiving the first training data set including the first training articles that include training dates;

inputting the first training data set to a first ML model;

training the first ML model to extract the candidate dates from the first training articles; and generating the first trained ML model.

14. The computerized method of claim 10, further comprising:

at training time, receiving the second training data set including the second training articles that include the first set of dates that are labeled with the tax effective date classification and the second set of dates that are labeled with the date other than a tax effective date classification;

inputting the second training data set to a second ML model;

training the second ML model to classify each extracted candidate date into one of plurality of classifications including the tax effective date and the date other than a tax effective date; and generating the trained second ML model.

15. The computerized method of claim 10, further comprising:

inputting the article to a regular expression engine; and extracting, via the regular expression engine, candidate tax rates and/or tax amounts from the article.

16. The computerized method of claim 15, further comprising:

creating a modified article that highlights the extracted candidate tax rates and the extracted candidate tax amounts.

17. A computing system, comprising:

a processor configured to:

at inference time, input an article to a first trained machine learning (ML) model;

extract, via the first trained ML model, candidate dates from the article;

input the extracted candidate dates to a second trained ML model;

classify, via the second trained ML model, each extracted candidate date into one of plurality of classifications including a tax effective date, a date other than a tax effective date, and a not-a-date;

at training time, receive a first training data set including first training articles that include dates;

input the first training data set to a first ML model;

train the first ML model on the first training data set to identify the candidate dates from the first training articles, to thereby generate the first trained ML model;

receive a second training data set including second training articles that include a first set of dates that are labeled with a tax effective date classification and a second set of dates that are labeled with a date other than a tax effective date classification, and that also include text that is not-a-date;

input the second training data set to a second ML model; and train the second ML model on the second training data set to classify each extracted candidate date into one of plurality of classifications including the tax effective date, the date other than a tax effective date, and a not-a-date classification, to thereby generate the trained second ML model, wherein the first trained ML model is a named entity recognition model, the second trained ML model is a neural network model that utilizes pretrained contextual embedding representations of words and entities, the tax effective date, the date other than the tax effective date, and the not-a-date are highlighted in a different manner so as to be visually distinguishable from each other, the second training articles of the second training data set are divided into sentences by a sentence divider and processed by the second trained ML model one sentence at a time, each sentence being included together with start and end offsets of the candidate dates for classification.

* * * * *